US012714063B2

(12) United States Patent
McGuffie Pierce et al.

(10) Patent No.: US 12,714,063 B2
(45) Date of Patent: Aug. 25, 2026

(54) REMOVABLE RODENT CAGE DIVIDER

(71) Applicant: INNOVIVE, INC., San Diego, CA (US)

(72) Inventors: Francesca McGuffie Pierce, San Diego, CA (US); Dee L Conger, Alpine, CA (US); Jose Javier Fuentes, Oceanside, CA (US)

(73) Assignee: INNOVIVE, INC., San Diego, CA (US)

( * ) Notice: Subject to any disclaimer, the term of this patent is extended or adjusted under 35 U.S.C. 154(b) by 0 days.

(21) Appl. No.: 19/319,428

(22) Filed: Sep. 4, 2025

(65) Prior Publication Data

US 2026/0000049 A1 Jan. 1, 2026

Related U.S. Application Data

(63) Continuation of application No. 18/706,376, filed as application No. PCT/US2023/085944 on Dec. 26, 2023.

(60) Provisional application No. 63/611,699, filed on Dec. 18, 2023.

(51) Int. Cl.

| | |
|---|---|
| ***A01K 1/03*** | (2006.01) |
| ***A01K 1/00*** | (2006.01) |
| ***A01K 1/035*** | (2006.01) |
| ***A01K 1/10*** | (2006.01) |

(52) U.S. Cl.
CPC ............ *A01K 1/031* (2013.01); *A01K 1/0005* (2013.01); *A01K 1/035* (2013.01); *A01K 1/10* (2013.01)

(58) Field of Classification Search
CPC ................................ A01K 1/031; A01K 1/035
See application file for complete search history.

(56) References Cited

U.S. PATENT DOCUMENTS

| | | | | | |
|---|---|---|---|---|---|
| 3,256,859 A | * | 6/1966 | Petit, Jr. | A01K 1/0356 | 123/73 A |
| 3,343,520 A | * | 9/1967 | Schwarz, Jr. | A01K 1/035 | 119/419 |
| 3,498,265 A | * | 3/1970 | Sterner | A01K 31/005 | 119/452 |
| 3,699,925 A | * | 10/1972 | Van Dongen | A01K 1/0356 | 119/475 |

(Continued)

FOREIGN PATENT DOCUMENTS

| | | | | |
|---|---|---|---|---|
| CA | 3011039 A1 | * | 1/2019 | A01K 1/031 |
| CN | 109380129 A | * | 2/2019 | A01K 1/031 |

(Continued)

*Primary Examiner* — Morgan T Jordan

(74) *Attorney, Agent, or Firm* — Mintz, Levin, Cohn, Ferris, Glovsky and Popeo, P.C.

(57) ABSTRACT

An improvement for an animal cage is disclosed. The animal cage may include a first, second, third and fourth vertical wall, each of which is connected to a floor on a first end and includes a top rim opposite to the first end. The improvement includes a support structure and a removable divider. The support structure includes at least one slot, is positioned above the floor and may be connected adjacent to the top rim of the first and second vertical walls. The removable divider is inserted into the slot and extends vertically away from the floor. A snap-fit connection detachably connects the divider to the support structure.

17 Claims, 15 Drawing Sheets

(56) References Cited

U.S. PATENT DOCUMENTS 4,640,228 A * 2/1987 Sedlacek ................ A01K 1/031 119/419
4,940,017 A * 7/1990 Niki ....................... A01K 1/031 119/72.5
5,158,040 A * 10/1992 Martin ..................... A01K 5/01 119/58
5,688,297 A * 11/1997 Spengler ................ B01D 46/10 55/472
5,694,885 A * 12/1997 Deitrich ............... A01K 1/0356 119/467
5,924,384 A * 7/1999 Deitrich ................. A01K 1/031 119/419
6,041,741 A * 3/2000 Gabriel .............. B01D 53/9409 119/419
6,227,146 B1 * 5/2001 Gabriel .................. B01D 46/10 119/419
6,526,915 B1 * 3/2003 Gabriel .................. A01K 1/031 119/72.5
6,543,387 B1 * 4/2003 Stein .................... A01K 1/0245 119/419
6,729,266 B1 * 5/2004 Gabriel .................. A01K 1/031 119/419
6,766,768 B1 * 7/2004 Ver Hage ............... A01K 1/031 119/475
7,380,435 B1 * 6/2008 Henderson ............. A01K 1/031 119/720
7,527,020 B2 * 5/2009 Conger .................. A01K 1/031 119/417
7,661,392 B2 * 2/2010 Conger .................. A01K 1/031 119/452
7,954,455 B2 * 6/2011 Conger ................ A01K 1/0356 119/419
8,156,899 B2 * 4/2012 Conger ................ A01K 1/0356 119/470
9,051,083 B1 6/2015 Davis et al.
10,448,612 B2 * 10/2019 Conger .................. A01K 1/031
2002/0043217 A1 * 4/2002 Rivard ................. A01K 1/0064 119/419
2002/0195060 A1 * 12/2002 Dollahan ................. A01K 5/01 119/58
2003/0019439 A1 * 1/2003 Krause ..................... A01K 1/03 119/472
2004/0016407 A1 * 1/2004 Axelrod ............... A01K 1/0356 119/51.01
2004/0045511 A1 * 3/2004 Migita ................... A01K 1/031 119/472
2004/0231611 A1 * 11/2004 Gabriel .................. A01K 1/031 119/475
2005/0235923 A1 * 10/2005 Niki ....................... A01K 31/04 119/479
2005/0241591 A1 * 11/2005 Ingley, III .............. A01K 1/031 119/455
2007/0181074 A1 * 8/2007 Conger .................. A01K 1/031 119/417
2007/0181075 A1 * 8/2007 Conger ................ A01K 1/0356 119/458
2008/0066688 A1 * 3/2008 Malnati .................. A01K 1/031 119/419
2008/0236506 A1 * 10/2008 Conger ................ A01K 1/0356 119/417
2011/0168104 A1 7/2011 Michael et al.
2013/0220229 A1 8/2013 Conger et al.
2019/0124884 A1 * 5/2019 Ihrke .................... A01K 1/0356
2019/0183089 A1 * 6/2019 Harada .................... A01K 1/03
2020/0288685 A1 9/2020 Rood et al.
2021/0144954 A1 5/2021 Cantwell et al.
2021/0185975 A1 * 6/2021 Strauss .................. A01K 1/031
2021/0352869 A1 * 11/2021 Storto ................ A47B 87/0207
2023/0292706 A1 * 9/2023 Maddahi ................ A01K 1/031 119/51.02
2026/0013463 A1 1/2026 McGuffie et al.

FOREIGN PATENT DOCUMENTS

CN 111903541 A * 11/2020 ............. A01K 1/031
CN 114586689 A * 6/2022 ........... A01K 29/005
CN 117502259 A * 2/2024 ............. A01K 1/031
CN 119404764 A * 2/2025 ........... A01K 1/0356
GB 2342842 A * 4/2000 ............. A01K 1/031
KR 100932115 B1 * 12/2009 ............. A01K 1/035
KR 102508625 B1 * 3/2023 ............... A01K 5/01
WO WO-0074473 A2 * 12/2000 ............. A01K 1/031
WO WO-2008021492 A2 * 2/2008 ............. A01K 1/031
WO WO-2025136420 A1 * 6/2025 ............. A01K 1/035

* cited by examiner

Section A-A

Section B-B

Section C-C

Section D-D

Section E-E

20

5
40-1
20

5
40-2
20

5
40-3

REMOVABLE RODENT CAGE DIVIDER

PRIORITY APPLICATIONS AND REFERENCES

This application relates to U.S. Pat. No. 11,643,248 issued on May 9, 2023 and entitled "Nestable Animal Containment Cage Bases and Covers and Nesting Processes." This application claims priority to U.S. patent application Ser. No. 18/706,376 filed on Apr. 30, 2024 and entitled "A Removable Rodent Cage Divider," which is the Section 371 national filing of P.C.T. Application PCT/US23/85944 filed on Dec. 26, 2023 and entitled "A Removable Rodent Cage Divider," which in turn claims priority to U.S. Provisional Application 63/611,699 filed on Dec. 18, 2023 and entitled "A Removable Rodent Cage Divider." All of these applications are incorporated herein by reference in their entireties.

TECHNICAL FIELD

The present disclosure relates in part to animal husbandry, and relates in part, to equipment for caging laboratory animals.

BACKGROUND

Many laboratory animals, especially rodents, are often raised in a laboratory setting for biological and behavioral experiments that can shed light on mammalian physiology, reactions to certain foods or substances with a medicinal purpose, or behavior. In many studies, the animals are individually caged, and sometimes the animals are moved from one cage to another to observe various behaviors. Rack space can be very expensive, so various improvements to animal cages can improve the versatility of cage space and improve use of laboratory space.

Some animal studies, such as those focused on social behaviors, may entail enclosing more than one animal in a way that they can interact by seeing and smelling one another, but they cannot fight and hurt one another. While this can be achieved by placing two cages next to each other, this would require more space, and the distance between the animals may be greater than desired due to the geometry of cages and whether the cages used can be nested or stack in a space-efficient manner. In order to study the behavior of different individual animals living in close proximity, it is desirable to somewhat constrain the physical contact between individual animals in the same cage, such as by means of a customizable divider that would still enable the animals to interact via sight and smell.

In the prior art, there are instances of removable divider doors that facilitate entry from one cage into another, as provided in US Publication 2011/0168104 to Matteson et al. However, such an arrangement does not prevent physical contact that could lead to fighting between two animals, and does not save valuable rack space when providing the means to observe an interaction. Instead, what is needed is a more space saving arrangement, whereby a removable divider better makes use of a space within the same cage to facilitate interactions among animals, and preferably allows for versatile, modular configurations of enclosed cage space.

SUMMARY

An improvement for an animal cage is disclosed. The animal cage may include a first, second, third and fourth vertical wall, each of which is connected to a floor on a first end and includes a top rim opposite to the first end. The improvement includes a support structure and a removable divider. The support structure includes at least one slot configured to be removably connected to the removable divider or another removable structure, spans over the floor, and may be connected adjacent to the top rim of the first and second vertical walls. The removable divider is inserted into the slot and extends vertically away from the floor. A snap-fit connection detachably connects the divider to the support structure.

The support structure may include a plurality of slots, where each in the plurality can support the snap-fit connection. Also, each in the plurality of slots is adapted to divide the animal cage in a different configuration. The support structure may be a food trough.

The removable divider may extend from the support structure to the third vertical wall and may also extend further to the fourth vertical wall. The removable divider may also have a support cutout that at least partially surrounds the support structure. The shape of the support cutout may be complementary to the cross-sectional shape of the support structure. The removable divider may have a plurality of holes. The removable divider may be full-length (extending from one vertical wall to the opposite vertical wall) or partial-length (extending from one vertical wall but not reaching the opposite vertical wall). The removable divider may connect to and support other structures that may be added inside a cage, such as a wheel or a platform.

The support structure may have a spine, and the removable divider may have a wrap-around notch. A snap-fit connection may comprise having the spine of the support structure inserted into the wrap-around notch of the divider.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF EXAMPLE EMBODIMENTS

Figures 1A, 1B:
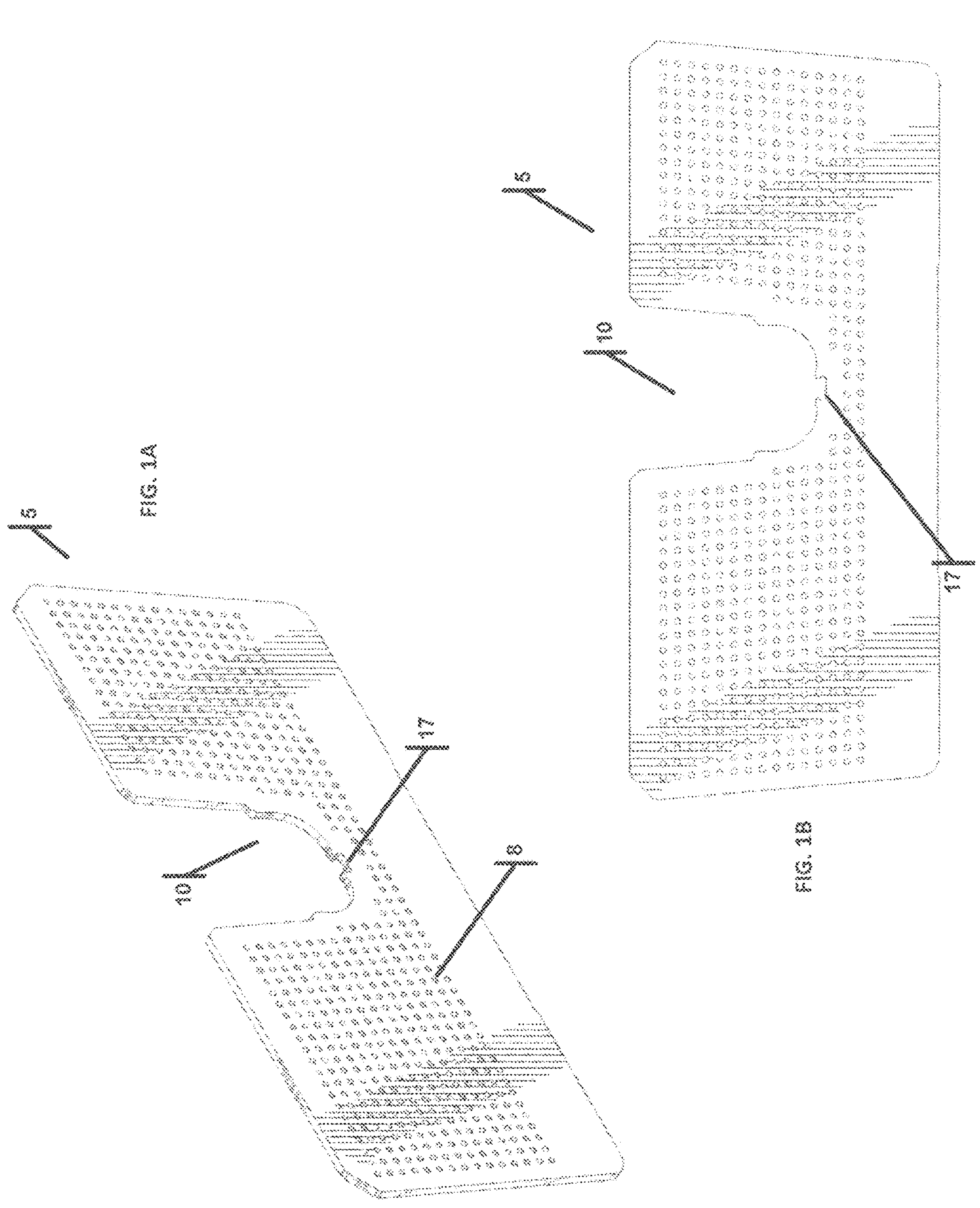
FIG. 1A illustrates a top isometric view of a full-length rodent cage divider.
FIG. 1B illustrates a front view of the full-length rodent cage divider.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in a singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship, or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds to the attached figures and is provided for ease of reference, where like reference numerals designate corresponding features throughout the specification and figures:

Divider 5
Divider (Partial) 5A
Holes 8
Support Cutout 10
Snap Fit Connection 15
Wrap-Around Notch 17
Spine 19
Cage 20
First Vertical Wall 20-1
Second Vertical Wall 20-2
Third Vertical Wall 20-3
Fourth Vertical Wall 20-4
Floor 20-5
Top Rim 20-6
Lid 22
Second Snap-Fit Connection 22-1, 22-2
Food Trough (Support Structure) 25
Wheel 30
Platform 35
Divider Insert Slots 40, 40-1, 40-2, 40-3

Figure 1C:
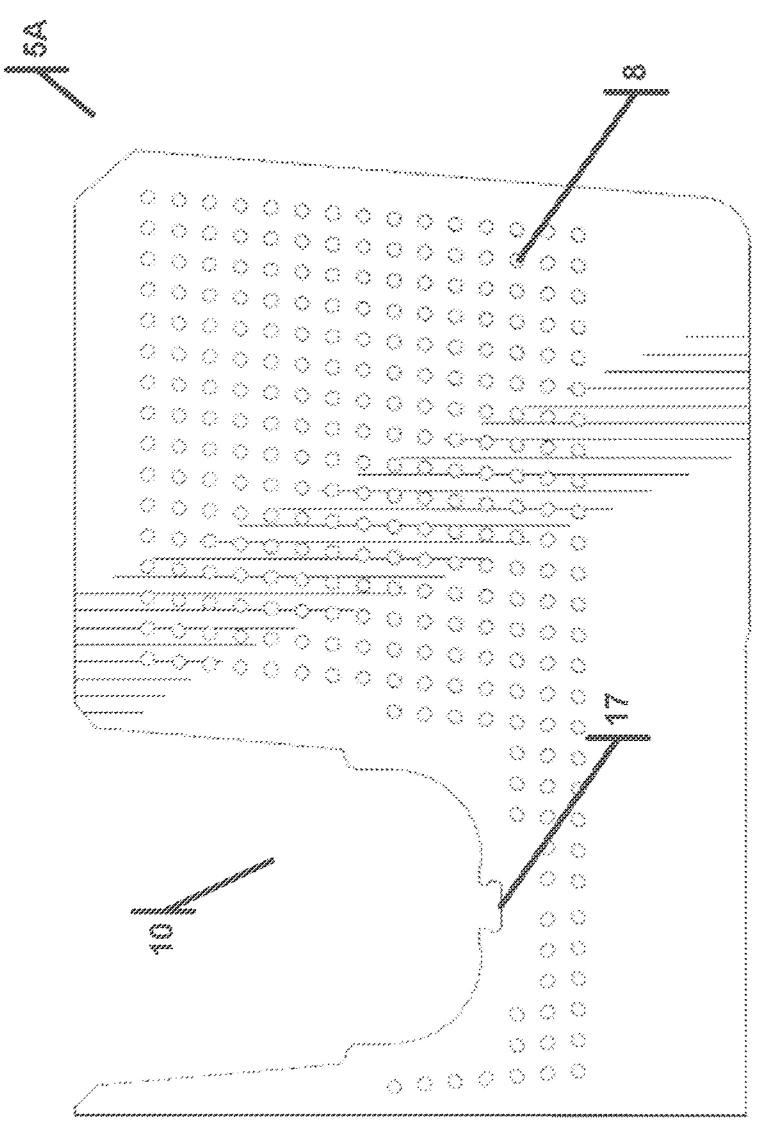
FIG. 1C illustrates a front view of the partial-length rodent cage divider.

In FIGS. 1A and 1B, a full-length removable divider 5 is shown in isometric and front views, respectively. The divider 5 comprises a support cutout 10 that will at least partially surround a support structure 25 that will be positioned above the divider 5. The shape of the support cutout 10 is preferably complementary to the cross-sectional shape of the support structure 25 that spans across the animal cage 20 above the floor 20-5. The divider 5 may comprise a plurality of holes 8 to facilitate animal interaction when the divider 5 is placed inside an animal cage 20 to separate individual animals within the same cage 20 and to allow for interaction via smell and sound while preventing physical touching. In FIG. 1C, a partial-length divider 5A is shown. The divider 5A of FIG. 1C also comprises a plurality of holes 8, a support cutout 10, and a wrap-around notch 17 in the support cutout 10. The partial-length divider 5A has a shorter length dimension and, while it similarly comprises a support cutout 10 that is complementary to the cross-sectional shape of the support structure 25, the removable divider 5A does not itself span across the entire length of the animal cage 20 when placed inside it. In the preferred embodiments, the removable divider 5 is relatively planar and, as such, manufacturing can be simplified by use a die-cut plastic or a laser cut plastic.

Figure 2A:
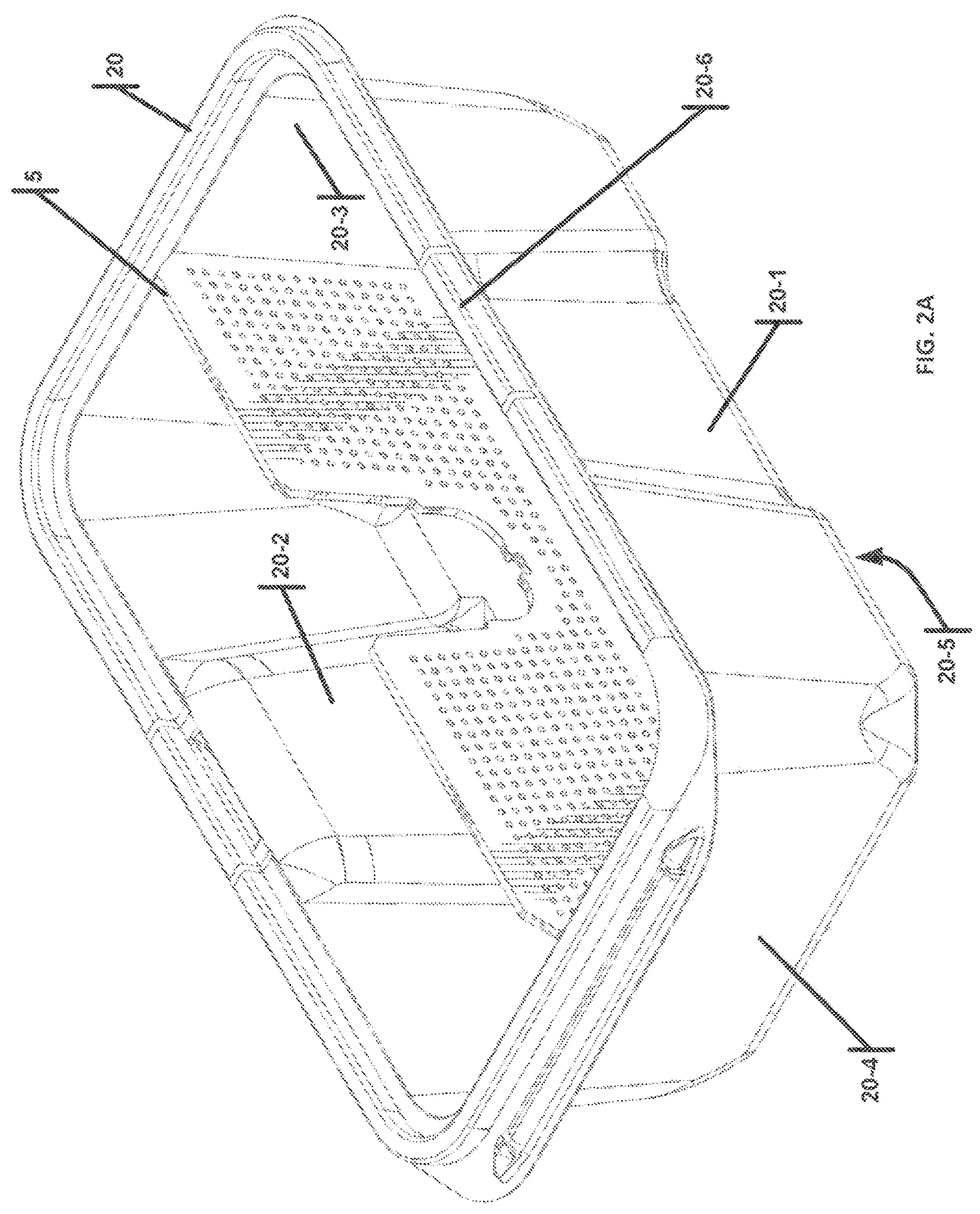
FIG. 2A illustrates a top isometric view of the full-length rodent cage divider placed into a rodent cage.
Figure 2B:
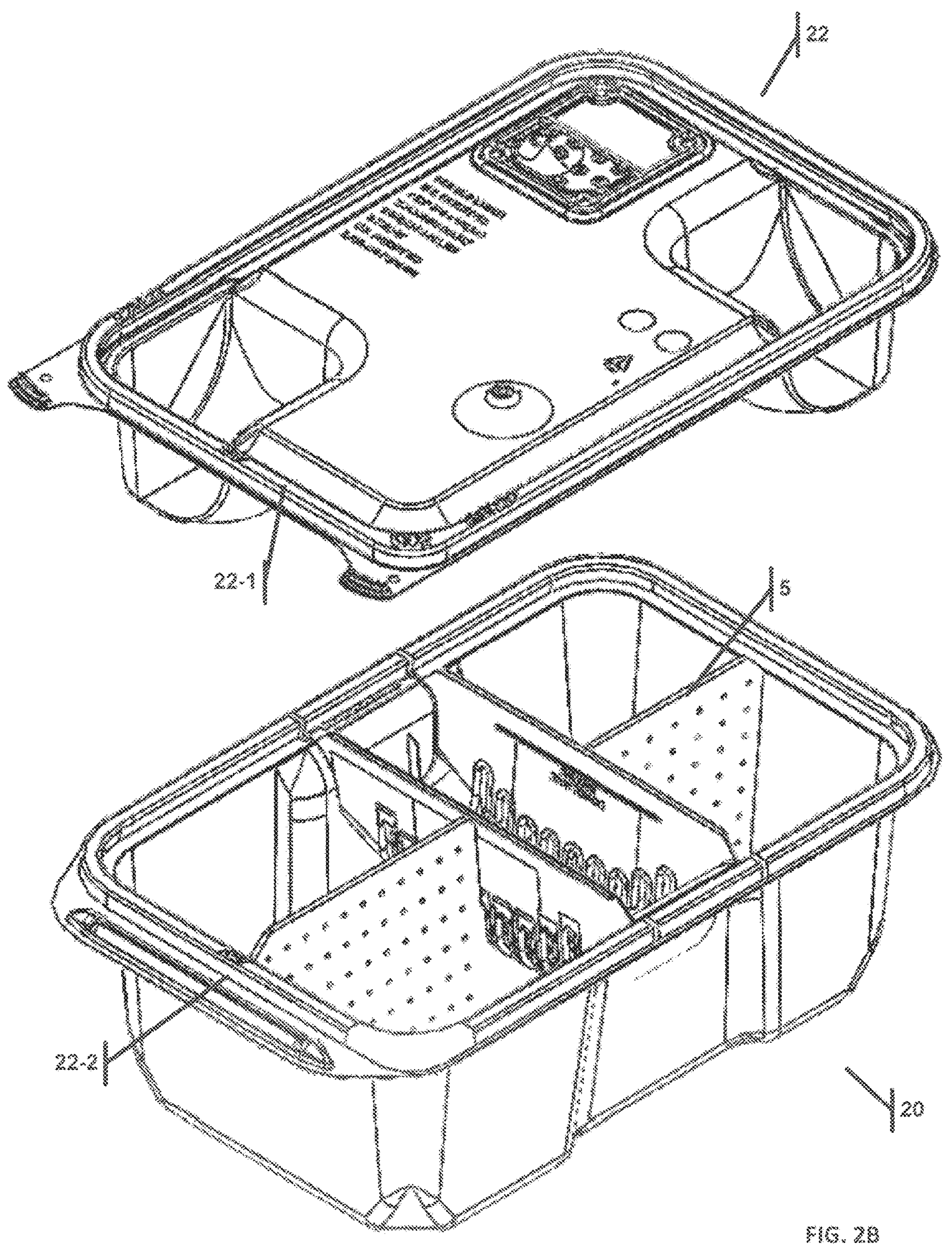
FIG. 2B illustrates a top isometric view of the full-length rodent cage divider placed into a rodent cage, and a lid positioned over the cage.
Figure 2C:
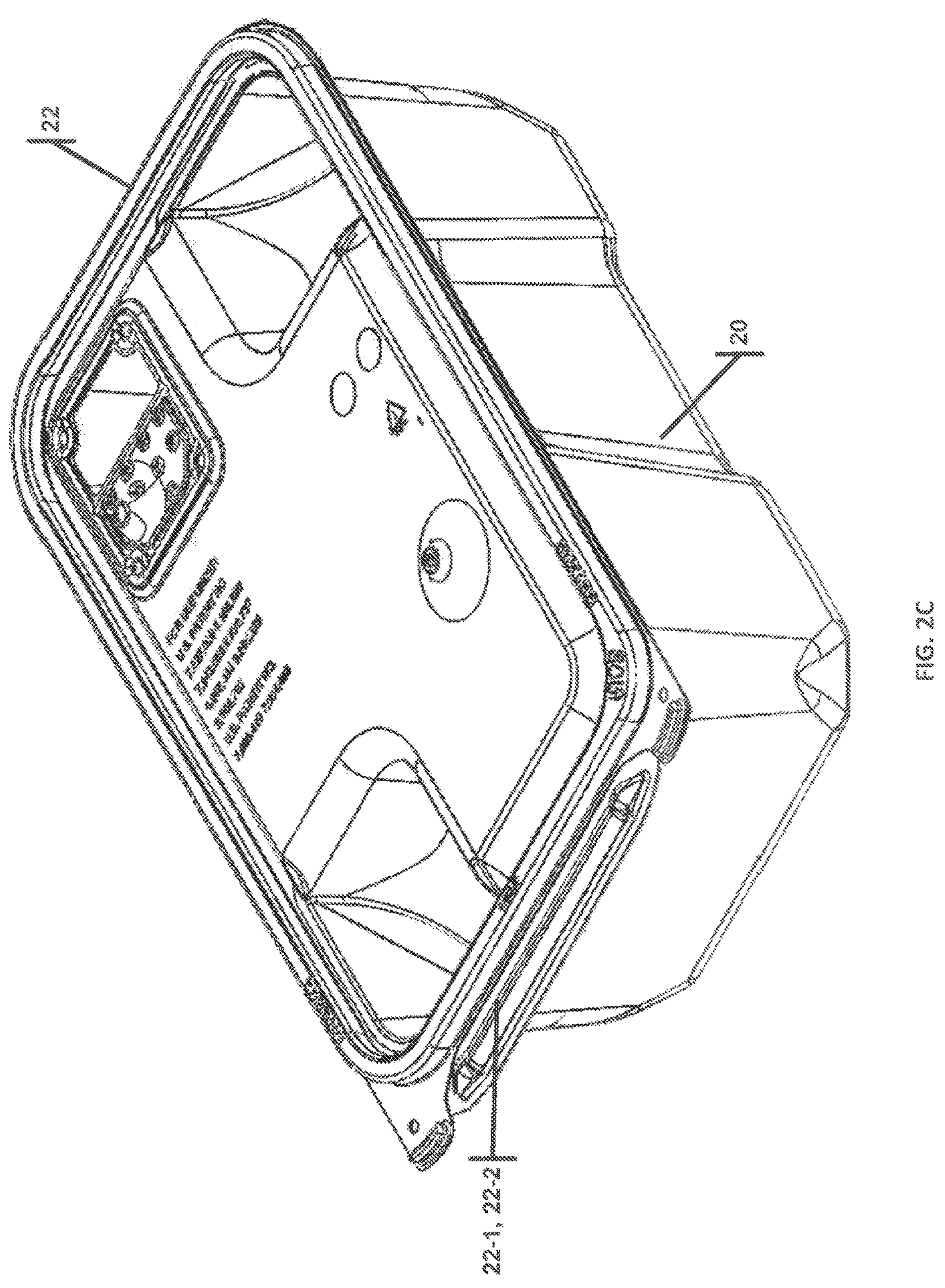
FIG. 2C illustrates a top isometric view of the full-length rodent cage with a lid.

In FIG. 2A, the cage 20 is illustrated with the removable divider 5 placed inside it. The cage 20 comprises a first (20-1), second (20-2), third (20-3) and fourth (20-4) vertical wall, each of which is connected to a floor 20-5 of the cage 20 on a first end and includes a top rim 20-6 opposite to the first end. The first vertical wall 20-1 is on the opposite side of the cage 20 from the second vertical wall 20-2, and the third vertical wall 20-3 is on the opposite side of the cage 20 from the fourth vertical wall 20-4. FIG. 2B illustrates a lid 22 that has a second snap-fit connection 22-1 that mates with the cage 20 along the snap-fit connection 22-2.

Figure 3A:
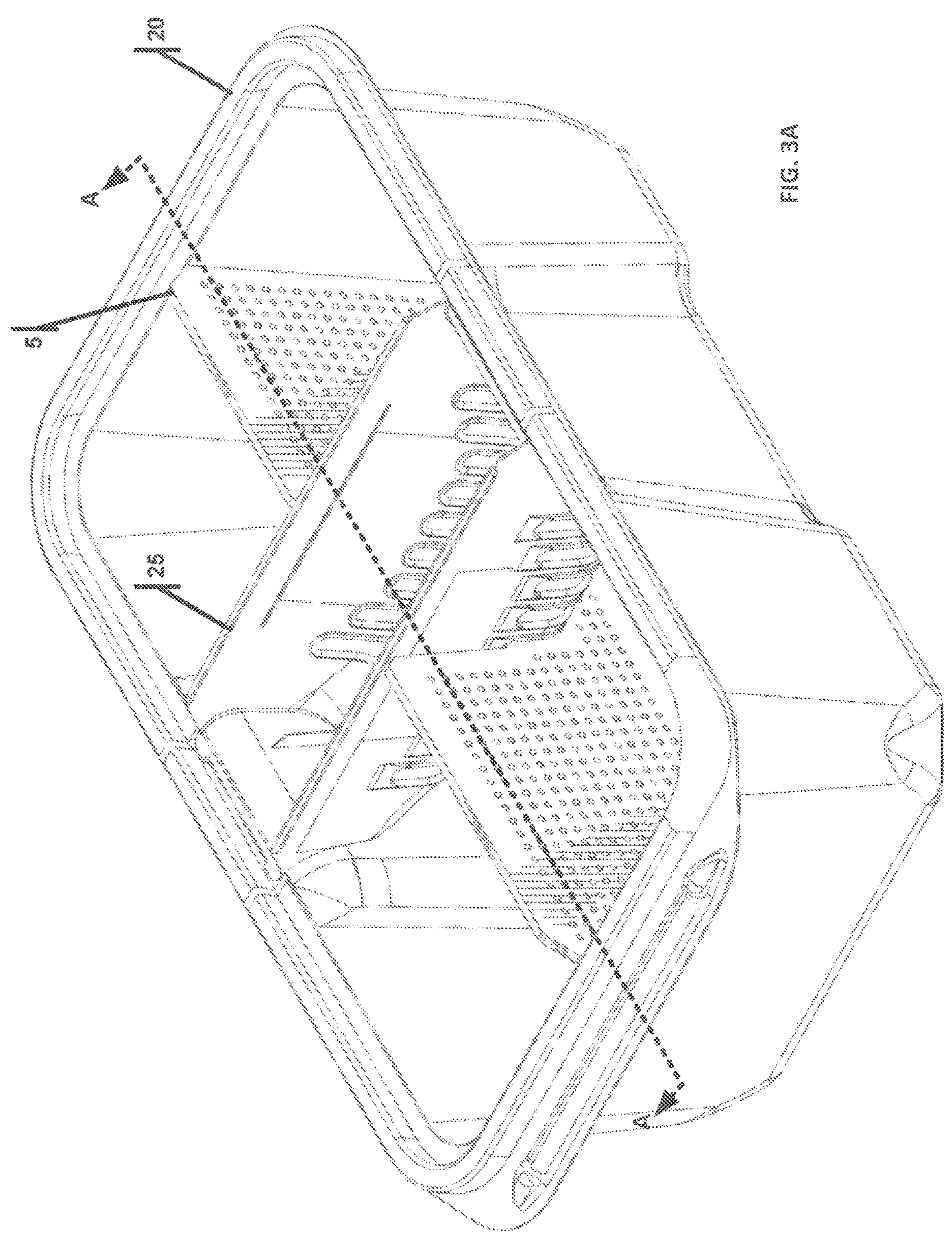
FIG. 3A illustrates a top isometric view of the full-length rodent cage divider placed into a rodent cage, wherein the cage divider snap-fits into a support structure (food trough).
Figure 6A:
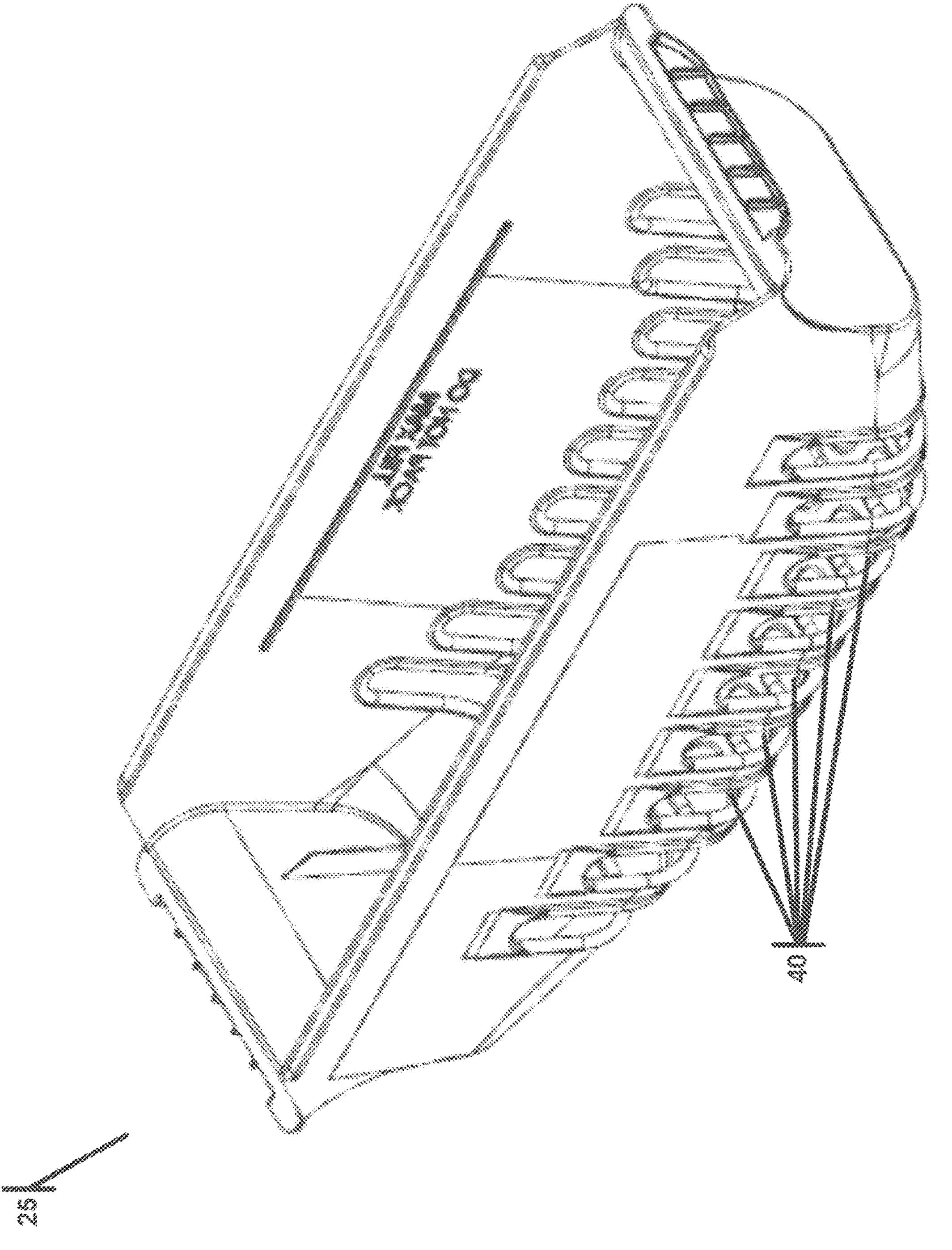
FIG. 6A is a top isometric view of the support structure (food trough).
Figures 6B, 6C:
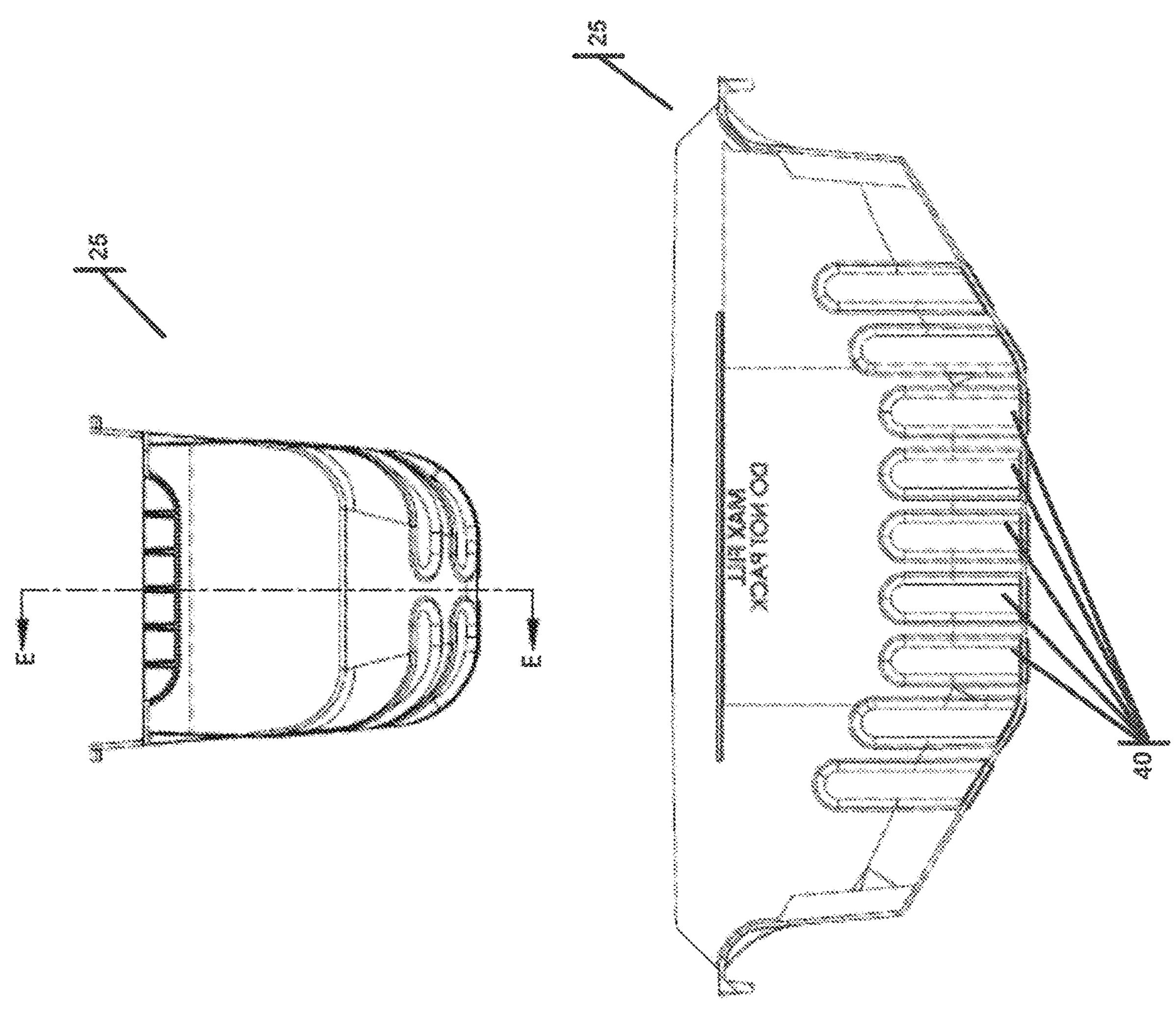
FIG. 6B is a side view of the support structure (food trough).
FIG. 6C is a cross-sectional view from line E-E of FIG. 6B.
Figure 6D:
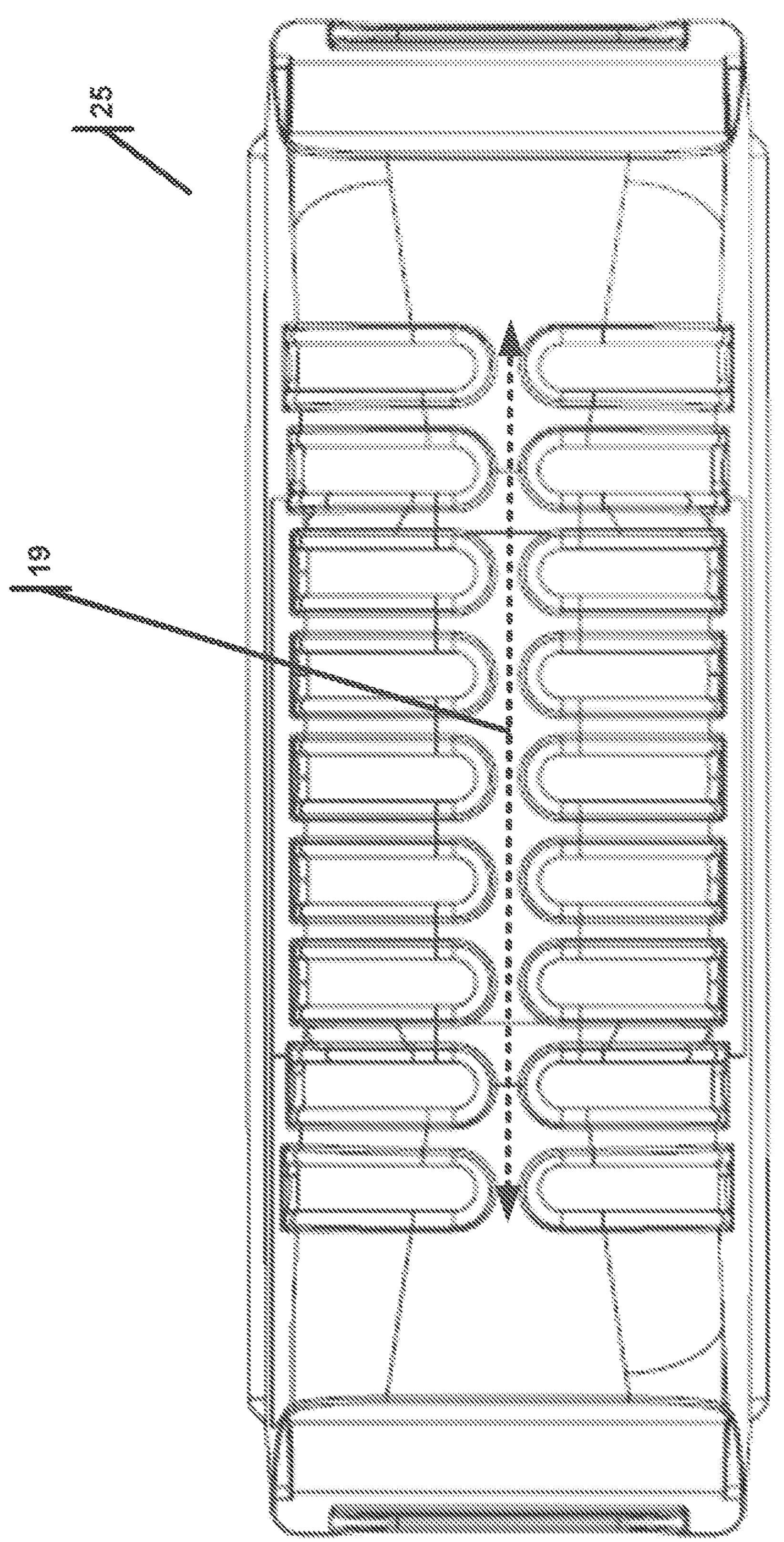
FIG. 6D is a top view of the support structure (food trough).

FIG. 3A shows the support structure 25 that spans over the floor of the cage and has a complementary cross-sectional shape to the support cutout shown in FIGS. 1A-1C. This support structure 25 may take the form of a food trough with many slots and can detachably connect to the divider 5 from above. This support structure or food trough 25 is shown by itself and as an isolated element in FIGS. 6A-6D, which also show a plurality of slots across the bottom of the support structure or food trough 25 in a top isometric view, a side view, and a cross-sectional view from line E-E drawn in FIG. 6B. In the bottom view of FIG. 6D, the arrows indicate the presence of a protruding spine 19 along the bottom of the support structure 25, and the spine 19 spans along the plurality of slots. Back in FIG. 3A, the support structure 25 is in connection with the divider 5, which is inserted into a slot, with the divider 5 extending vertically away from the floor 20-5 of the cage 20. FIG. 3A also shows a line A-A along the length of the full-length divider 5, and the cross-sectional view along A-A can be seen in FIG. 3B, where it can be seen more evidently that the support cutout of the divider 5 is complementary to the cross-sectional shape of the support structure or food trough 25. Moreover, FIG. 3B illustrates a snap-fit connection 15 detachably connecting the divider 5 to the support structure 25 that is further shown in magnified detail below that in FIG. 3C.

Figures 3B, 3C:
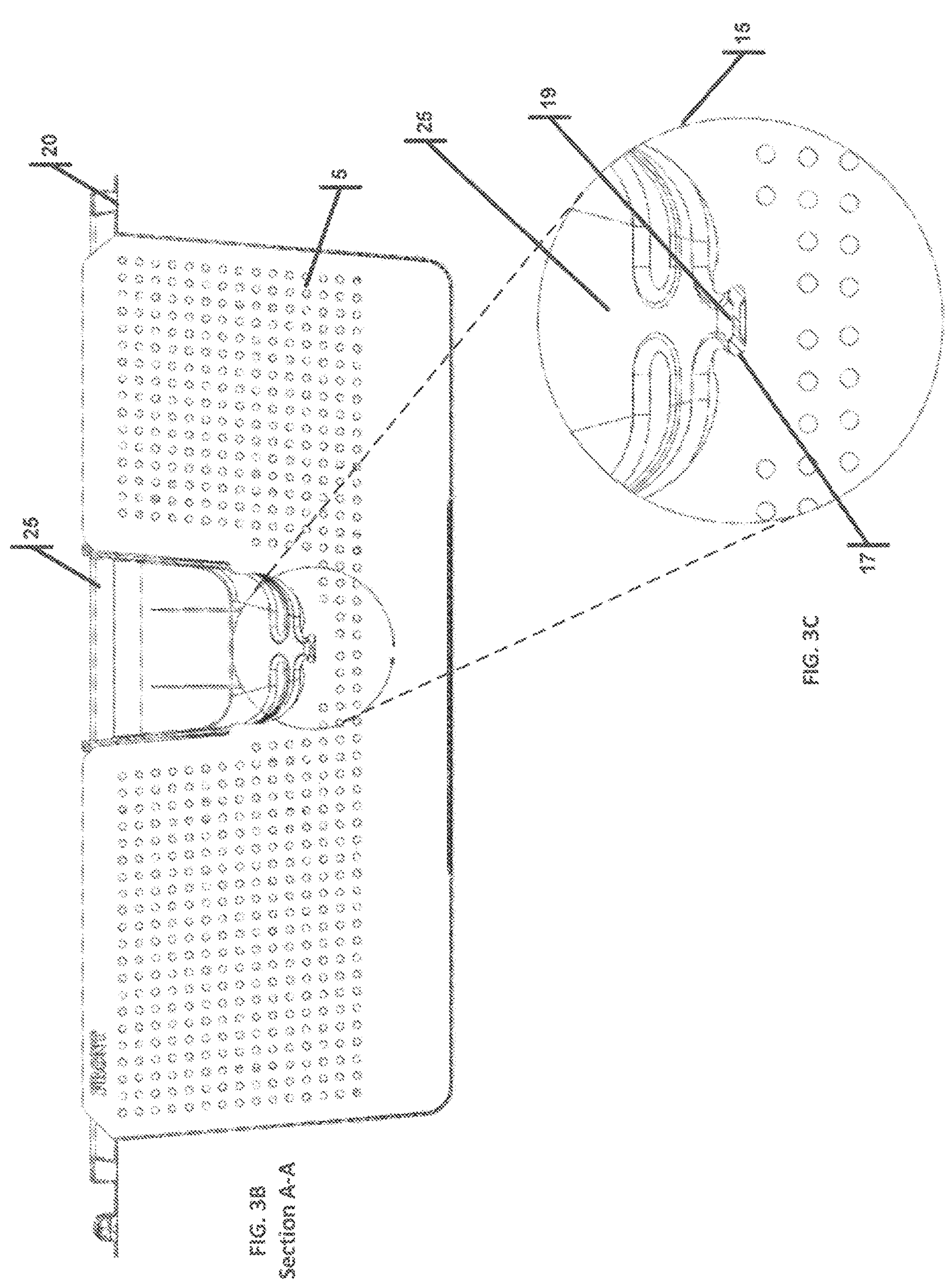
FIG. 3B is a cross-sectional view from line A-A of FIG. 3A.
FIG. 3C is an enlarged view of the snap-fit region of the full-length cage divider and support structure (food trough).

In FIG. 3C, it can be seen that the support structure or food trough 25 comprises a spine 19, which may also be complementary in shape to the wrap-around notch 17 in the support cutout of the divider 5. The snap-fit connection 15 comprises having the spine 19 inserted into the wrap-around notch 17. It should be noted that, rather than support only one snap-fit connection 15, the support structure 25 comprises a plurality of slots 40, and each in the plurality of slots 40 can support the snap-fit connection 15 shown in FIG. 3C.

Figures 7A, 7B, 7C:
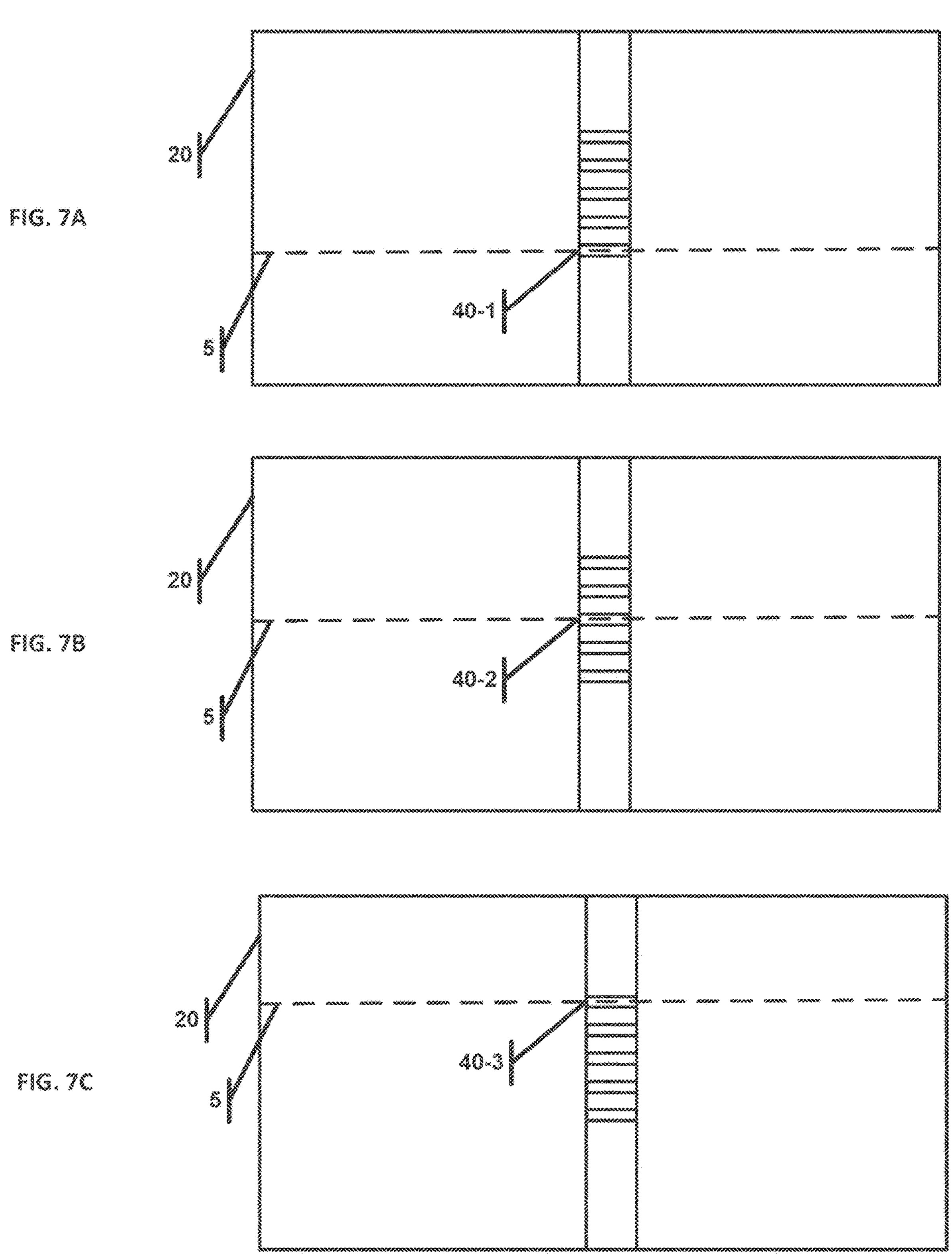
FIG. 7A illustrates a top view of the cage in a first configuration, when the removable divider is inserted into a first specific slot on the support structure.
FIG. 7B illustrates a top view of the cage in a second configuration, when the removable divider is inserted into a second specific slot on the support structure.
FIG. 7C illustrates a top view of the cage in a third configuration, when the removable divider is inserted into a third specific slot on the support structure.

Each in the plurality of slots 40 is also adapted to divide the cage 20, using the removable divider 5, in a different configuration. This versatility of the present invention's improvements to the animal cage 20 can be more readily seen in the top views of FIGS. 7A-7C. In the first top view, the divider 5 is placed into slot 40-1, at one end of the plurality of slots on the support structure; it can be seen that the divider 5 thus separates the cage into two distinct areas, a smaller area from the divider 5 to the closer vertical wall parallel to the divider 5, and a relatively larger area from the divider 5 to the opposite vertical wall parallel to the divider 5, which is located at a greater distance from the slot 40-1, shown in FIG. 7A. In FIG. 7B, the divider 5 is now placed into 40-2, which is itself at or adjacent to the middle of the support structure, approximately equidistant from either vertical wall the support structure is connected to, and the cage 20 is now divided into two approximately equal areas. Finally, in FIG. 7C, a third configuration is shown, where the divider 5 is now inserted into slot 40-3, located on the opposite end of the plurality of slots on the support structure compared to slot 40-1. Likewise, this configuration leaves a smaller enclosed area from the divider 5 to the closer vertical wall parallel to the divider 5, and a larger enclosed area from the divider 5 to the farther vertical wall parallel to the divider 5.

The removable divider can be full-length (shown in FIG. 4) or partial-length (shown in FIG. 5). The removable divider 5 extends from the support structure 25 to the third vertical wall 20-3 in one direction and to the fourth vertical wall 20-4 in the opposite direction. The removable divider 5A extends from the support structure 25 to the third vertical wall 20-3, but not to a fourth vertical wall 20-4, meaning that when this partial-length divider 5A is used, the divider 5A does not span across the entire cage to form two separate areas, but is configured as a partial wall in one part of the cage. Apart from having the versatility of different space configurations achievable with the present invention, the system can further provide support for other structures that may be placed inside a cage 20, such as a wheel or platform. These other structures may be supported by either the full-length divider 5 or the partial-length divider 5A.

Figure 4A:
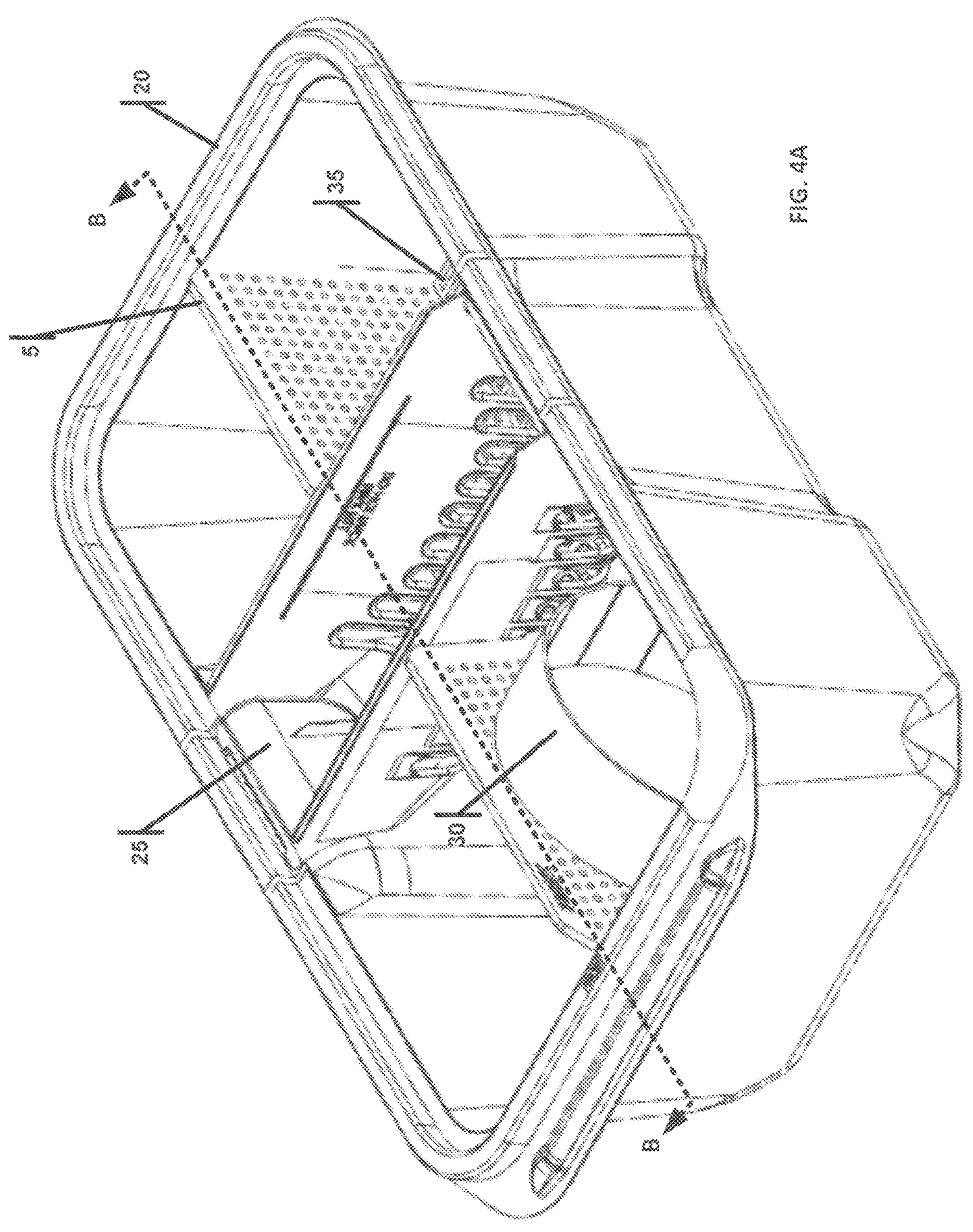
FIG. 4A illustrates a top isometric view of the full-length rodent cage divider placed into a rodent cage, wherein the cage divider snap-fits into a support structure (food trough) and supports an exercise wheel.

Turning now to FIG. 4A, the animal cage 20 is illustrated, comprising: a first (20-1), second (20-2), third (20-3) and fourth (20-4) vertical wall, each of which is connected to a floor 20-5 of the cage 20 on a first end and includes a top rim 20-6 opposite to the first end; a support structure 25 spanning over the floor 20-5 and connected adjacent to the top rim 20-6 for the first (20-1) and second (20-2) vertical walls, the support structure 25 comprising at least one slot 40; a removable divider 5 or 5A inserted into the slot 40, the divider (5, 5A) extending vertically away from the floor 20-5; and a snap-fit connection 15 detachably connecting the divider (5, 5A) to the support structure 25. The support structure 25 can be a food trough, serving to both support the divider 5 that fits into the slots, and allow an enclosed animal inside the cage to access food through one or more slots 40. As previously shown in magnified detail in FIGS. 3C and 6D, the support structure comprises a spine 19 running along the length of the plurality of slots 40 along the bottom of the support structure 25 that is used in the snap-fit connection between the support structure 25 and the removable divider (5, 5A); the removable divider (5, 5A) comprises a wrap-around notch 17 located at a spot along its support cutout 10; and the snap-fit connection 15 comprises having the spine 19 inserted into the wrap-around notch 17. As mentioned previously, the support structure 25 comprises a plurality of slots 40, and each in the plurality of slots 40 supports the snap-fit connection 15. Thus, each in the plurality of slots 40 is adapted to divide the animal cage 20 in a different configuration (FIGS. 7A-7D).

Figure 4B:
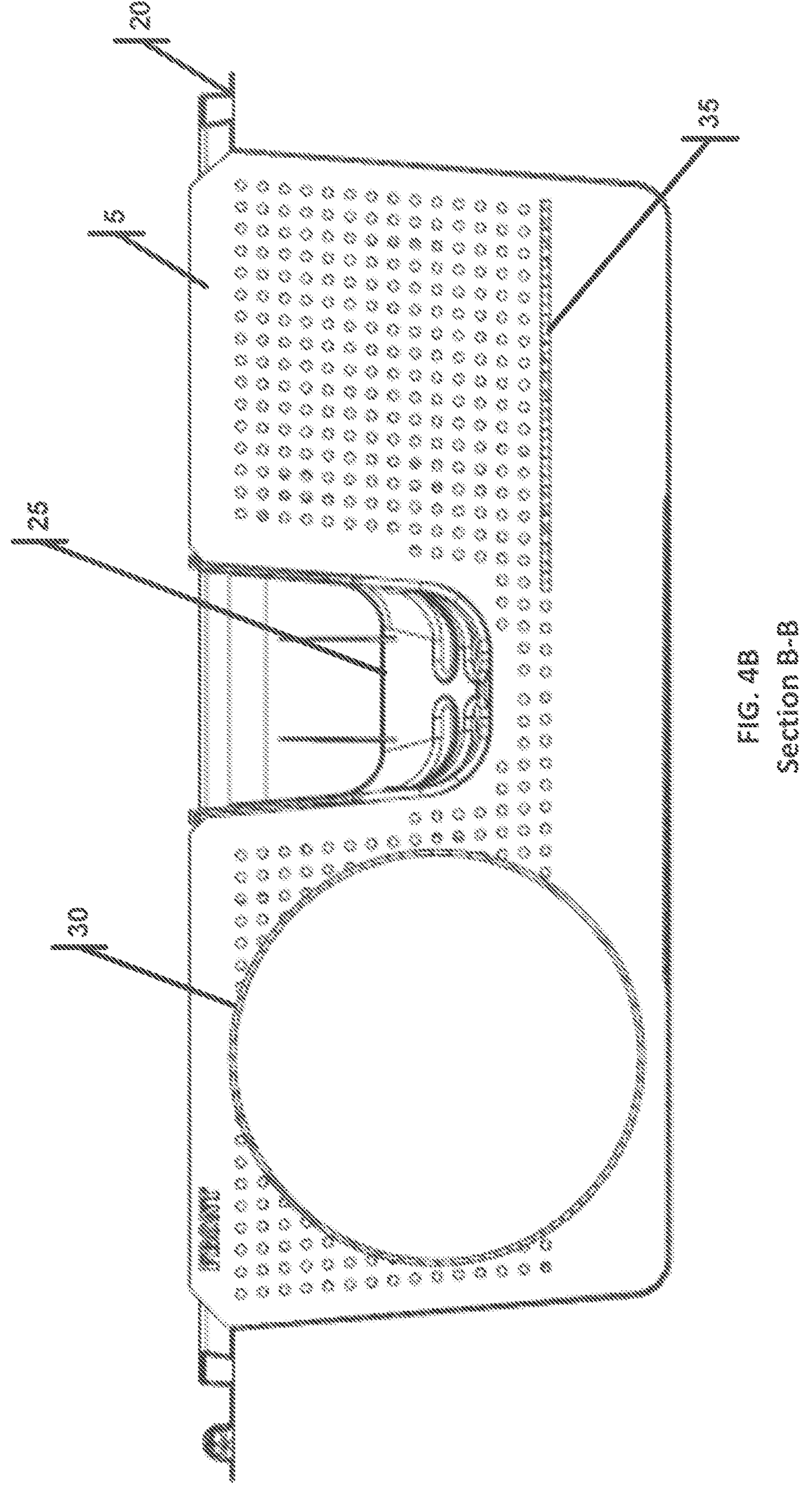
FIG. 4B is a cross-sectional view from line B-B of FIG. 4A.

FIGS. 4A-4B show a wheel 30 connected to the removable divider 5. Although these figures show the wheel 30 connected to a full-length divider 5, it is to be understood that, should there be no need to divide the cage 20 into two separate spaces, the wheel 30 may also be connected to a partial-length divider 5A. A cross-sectional view taken along the line of B-B in FIG. 4A is shown in FIG. 4B, where the side profile of a platform 35 can also be seen. It is to be understood that, a wheel or a platform are given as non-limiting examples of modular elements that may be connected to the removable divider, thus providing versatility and customizable functionality to the cage 20 by switching out the removable divider fitted to the support structure.

Figure 5A:
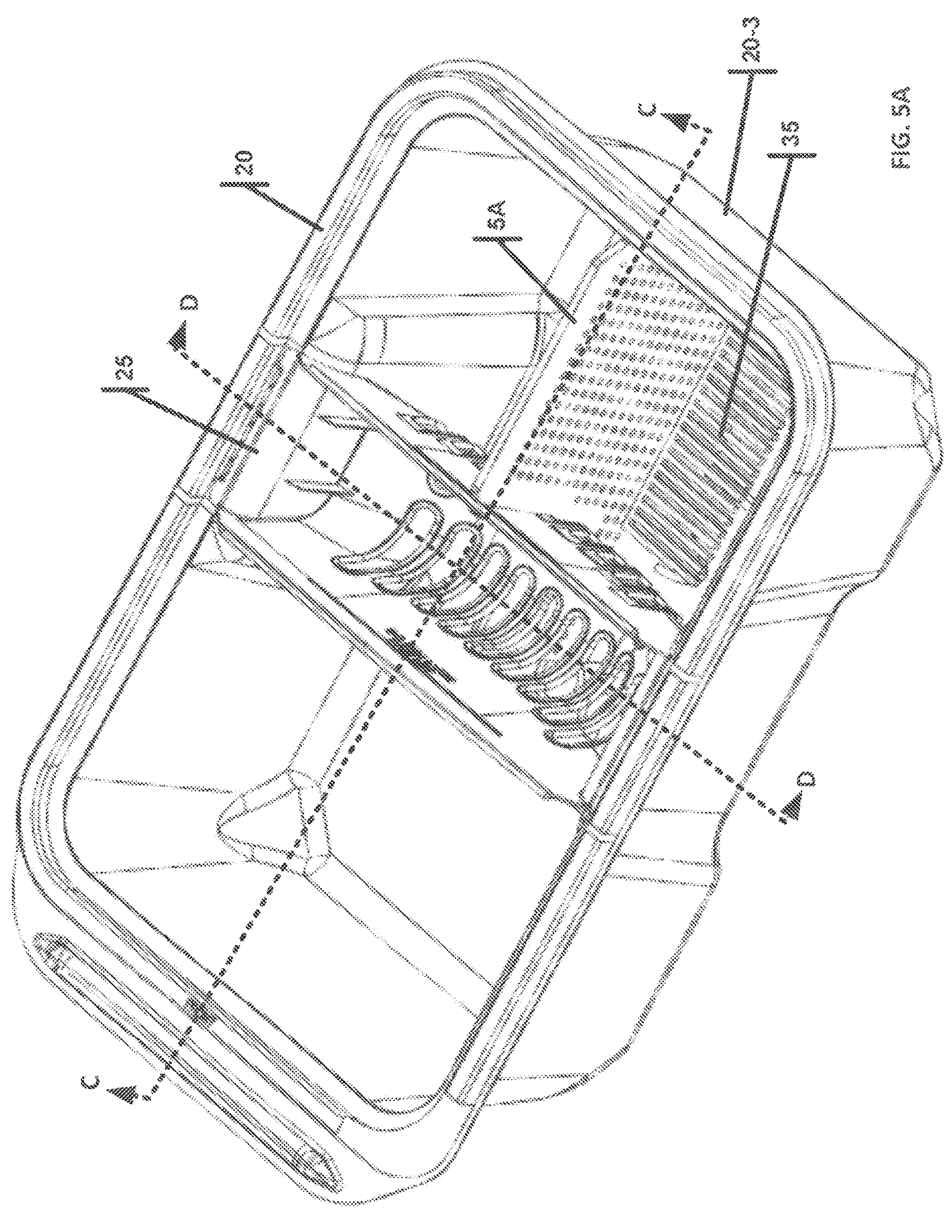
FIG. 5A illustrates a top isometric view of a partial-length rodent cage divider placed into a rodent cage, wherein the partial-length cage divider snap-fits into a support structure (food trough) and supports a platform.
Figures 5B, 5C:
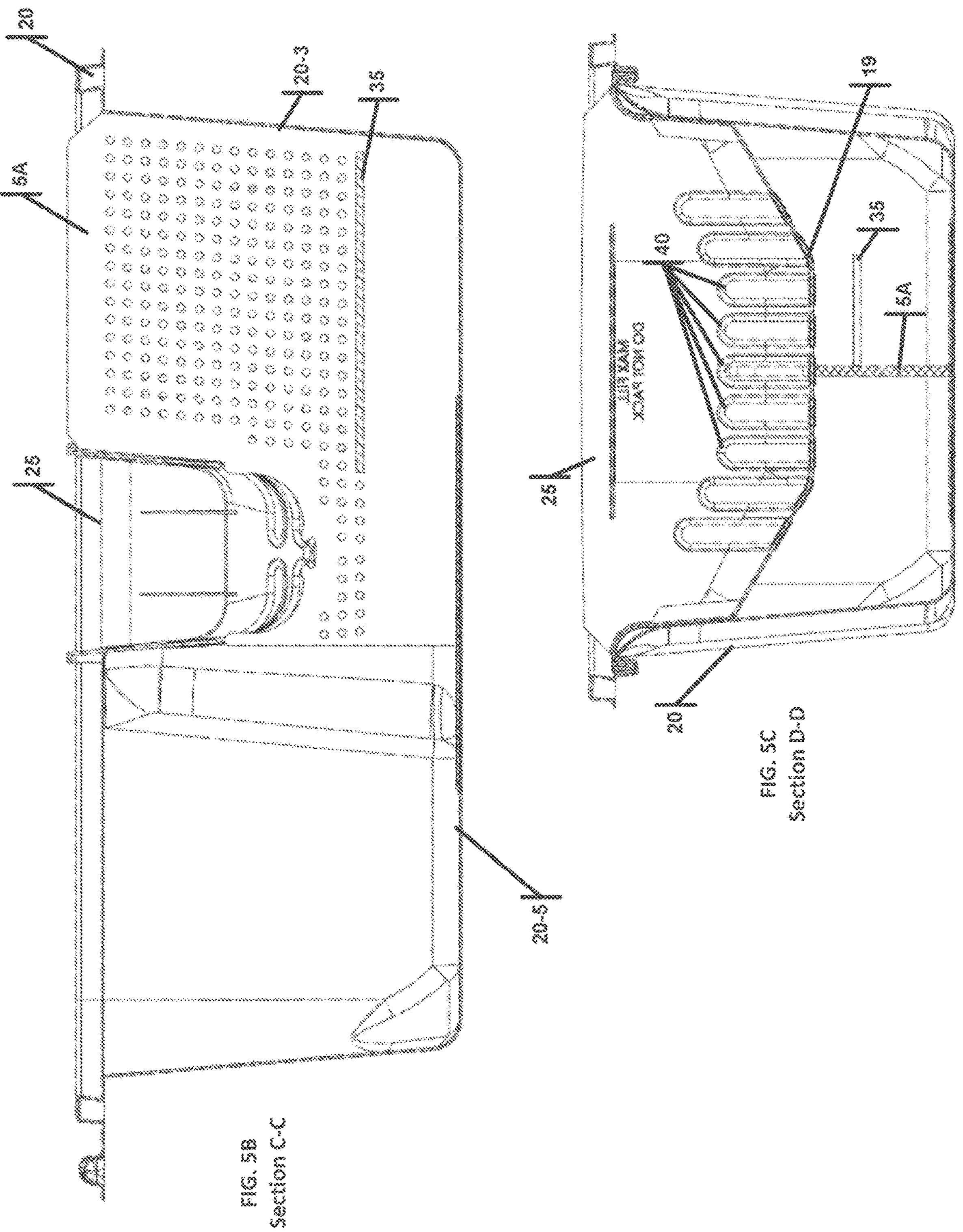
FIG. 5B is a cross-sectional view from line C-C of FIG. 5A.
FIG. 5C is a cross-sectional view from line D-D of FIG. 5A.

In FIG. 5A, depicting a partial-length divider 5A extending from the support structure 25 to the third vertical wall 20-3, a top isometric view is provided, along with cross-section lines C-C and D-D. It can be seen from this view that the platform 35 of this embodiment is slotted. Having a slotted platform 35 can confer advantages in better use of the space underneath the platform, such as (depending on the height of the particular hammock) hanging a tube that serves as a tunnel or a hammock for a rodent's diversion. It can also be used as enrichment for the rodents to climb on and across. FIG. 5B shows cross-section C-C, where it can be seen that the partial divider 5A complements the third vertical wall 20-3 and is connected to the support structure or food trough 25 via a snap-fit connection. FIG. 5C, showing the cross-section D-D, more distinctly illustrates the spine 19 along the bottom of the support structure (food trough) 25, and the side profile of the platform connected to the partial divider 5A.

While operations may be depicted in the drawings in a particular order, this should not be understood as requiring that such operations be performed in the particular order shown or in sequential order, or requiring that all illustrated operations be performed, to achieve desirable results. Moreover, the separation of various system components in the embodiments described in this patent document should not be understood as requiring such separation in all embodiments. Only a few implementations and examples are described and other implementations, enhancements, and variations can be made without departing from the scope and spirit of this invention, based on what is described and illustrated in this patent document While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A food trough comprising:
- a body extending between first and second opposing vertical walls of an animal cage, the body being positionable above a floor of the animal cage, wherein the body comprises:
  - a first side surface,
  - a second side surface disposed opposite the first side surface,
  - a third side surface, the third side surface being connected to the first side surface and the second side surface,
  - a fourth side surface disposed opposite the third side surface, and
  - a bottom surface comprising a plurality of flat planes, the plurality of flat planes including a first flat plane, a second flat plane disposed between the first flat plane and the first side surface, and a third flat plane disposed between the first flat plane and the second side surface, wherein an angle formed between the first and second flat planes is an obtuse angle;
- a plurality of slots disposed along at least a portion of the bottom surface, and at least a portion of the third side surface or the fourth side surface; and
- first and second protrusions extending from the first and second side surfaces of the body, respectively,
- wherein the food trough is configured to removably engage a top rim of each of the first and second opposing vertical walls by clipping around at least a portion of the top rim.

2. The food trough of claim 1, further comprising a spine extending along the body.

3. The food trough of claim 2, wherein the spine is disposed on the bottom surface.

4. The food trough of claim 1, wherein the first protrusion is configured to engage the top rim of the first opposing vertical wall, and wherein the second protrusion is configured to engage the top rim of the second opposing vertical wall.

5. The food trough of claim 1, wherein the food trough is configured to allow access to food through the plurality of slots.

6. An animal cage system comprising:
- an animal cage comprising:
  - a floor spanning a length and a width of the animal cage; and
  - first and second vertical walls disposed opposite one another and connected to the floor; and
- a food trough extending between the first and second vertical walls along the width of the animal cage, the food trough comprising:
  - a body positionable above the floor, wherein the body comprises:
    - a first side surface,
    - a second side surface disposed opposite the first side surface,
    - a third side surface connected to the first side surface and the second side surface,
    - a fourth side surface disposed opposite the third side surface, and
    - a bottom surface comprising a plurality of flat planes, the plurality of flat planes including a first flat plane, a second flat plane disposed between the first flat plane and the first side surface, and a third flat plane disposed between the first flat plane and the second side surface, wherein an angle formed between the first and second flat planes is an obtuse angle;
  - a plurality of slots disposed along at least a portion of the bottom surface, and at least a portion of the third side surface or the fourth side surface; and
  - first and second protrusions extending from the first and second side surfaces of the body, respectively,
  - wherein the food trough is configured to clip around at least a portion of the first and second vertical walls.

7. The animal cage system of claim 6, wherein the food trough is configured to removably connect to the cage base.

8. The animal cage system of claim 6, wherein the food trough comprises a spine extending along the body.

9. The animal cage system of claim 8, wherein the spine is disposed on the bottom surface.

10. The animal cage system of claim 6, wherein the first and second vertical walls each comprise a top rim configured to engage the food trough.

11. The animal cage system of claim 6, wherein the first protrusion is configured to engage the top rim of the first vertical wall, and wherein the second protrusion is configured to engage the top rim of the second vertical wall.

12. The animal cage system of claim 6, further comprising a cage lid configured to removably engage the animal cage.

13. The animal cage system of claim 12, wherein the cage lid comprises a first lip configured to mate with a second lip of the animal cage.

14. The animal cage system of claim 12, wherein the cage lid is configured to fully cover the food trough when the cage lid is engaged with the animal cage.

15. The food trough of claim 1, wherein the first protrusion includes a first portion extending outward from the body and a second portion extending downward from the first portion.

16. The animal cage system of claim 6, wherein the first protrusion includes a first portion extending outward from the body and a second portion extending downward from the first portion.

17. A food trough comprising:

a body extending between first and second opposing vertical walls of an animal cage, the body being positionable above a floor of the animal cage, wherein the body comprises:

a first side surface, a second side surface disposed opposite the first side surface, a third side surface, the third side surface being connected to the first side surface and the second side surface, a fourth side surface disposed opposite the third side surface, and a bottom surface comprising a plurality of flat planes, the plurality of flat planes including a first flat plane, a second flat plane disposed between the first flat plane and the first side surface, and a third flat plane disposed between the first flat plane and the second side surface, wherein an angle formed between the first and second flat planes is an obtuse angle;

a plurality of slots comprising at least one slot disposed on the first flat plane, at least one slot disposed on the second flat plane, and at least one slot disposed on the third flat plane; and first and second protrusions extending from the first and second side surfaces of the body, respectively, wherein the food trough is configured to removably engage a top rim of each of the first and second opposing vertical walls by clipping around at least a portion of the top rim.

* * * * *